(12) United States Patent
Miura

(10) Patent No.: US 6,952,775 B1
(45) Date of Patent: Oct. 4, 2005

(54) METHOD AND SYSTEM FOR ELECTRONIC AUTHENTIFICATION

(75) Inventor: Junichi Miura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1095 days.

(21) Appl. No.: 09/644,065

(22) Filed: Aug. 23, 2000

(30) Foreign Application Priority Data

Dec. 27, 1999 (JP) .............................. P11-369039

(51) Int. Cl.$^7$ .......................................... G06F 13/00
(52) U.S. Cl. ...................... 713/182; 713/186; 713/201
(58) Field of Search .................... 235/380; 280/70; 283/77; 340/825; 380/23, 25, 43, 262; 382/115, 382/118; 902/3, 29; 705/51; 713/162, 167, 713/168, 185, 193, 201, 182, 186

(56) References Cited

U.S. PATENT DOCUMENTS

| | | | |
|---|---|---|---|
| 4,510,382 A | | 4/1985 | Walter |
| 4,993,068 A | | 2/1991 | Piosenka et al. |
| 5,317,636 A | | 5/1994 | Vizcaino |
| 5,436,970 A | | 7/1995 | Ray et al. |
| 5,534,855 A | * | 7/1996 | Shockley et al. .......... 340/5.52 |
| 5,787,186 A | * | 7/1998 | Schroeder ................... 382/115 |
| 6,035,406 A | * | 3/2000 | Moussa et al. ............. 713/202 |
| 6,505,193 B1 | * | 1/2003 | Musgrave et al. ............. 707/3 |
| 6,615,353 B1 | * | 9/2003 | Hashiguchi ................. 713/185 |
| 6,655,585 B2 | * | 12/2003 | Shinn .......................... 235/382 |
| 6,775,775 B1 | * | 8/2004 | Yoshiura et al. ............. 713/186 |

FOREIGN PATENT DOCUMENTS

| | | |
|---|---|---|
| EP | 0789336 | 8/1997 |
| EP | 0919960 | 6/1999 |

OTHER PUBLICATIONS

Japanese Patent Abstract No. 10149103 published 1998.
Japanese Patent Abstract No. 11282998 published 1999.

* cited by examiner

*Primary Examiner*—Gregory A Morse
*Assistant Examiner*—Ellen C Tran
(74) *Attorney, Agent, or Firm*—Mattingly, Stanger, Malur & Brundidge, P.C.

(57) ABSTRACT

An electronic authentication method for identifying a user who is going to use a recording medium into which the information for making use of any kind of computerized service has been stored, comprising a step to carry out authentication by comparing the authentication information input by the user who is going to use the recording medium into which the information for making use of any kind of computerized service has been stored with the authentication information recorded on the recording medium and a step to carry out authentication by comparing the authentication information input by the user or the authentication information recorded on the recording medium with the registered authentication information existing in the hub of the networking to provide the service.

8 Claims, 7 Drawing Sheets

FIG.5

| 501 | 502 | 503 | 504 | 311 |
|---|---|---|---|---|
| WHAT IS SUB-JECTED TO AUTHENTICA-TION BY IMAGE | AUTHENTICA-TION LEVEL | ACCEPTABLE RANGE OF IMAGE RECOGNITION (FROM) | ACCEPTABLE RANGE OF IMAGE RECOGNITION (TO) | |

*1: "USER'S FACE PORTRAIT," "PRINT OF SEAL," "SIGNATURE," OR "SIMPLY EXECUTING AUTHENTICATION BY ID NUMBER AND PASSWORD RATHER THAN BY IMAGE"

*2: "AUTHENTICATION LEVEL A," "AUTHENTICATION LEVEL B," OR "AUTHENTICATION LEVEL C"

*3: IF "SIMPLY EXECUTING AUTHENTICATION BY ID NUMBER AND PASSWORD RATHER THAN BY IMAGE" IS SPECIFIED, "AUTHENTICATION LEVEL A" IS SET WITH THE ACCEPTABLE RANGE OF IMAGE RECOGNITION (FROM) (TO) BEING "0%."

FIG.6

| 601 | 602 | 603 | 604 | 605 | 606 | 607 |
|---|---|---|---|---|---|---|
| USER ID | USER PASS-WORD | PERSON-AL AUTHEN-TICATION INFO | AUTHENTI-CATION INFO ON THE EQUIP-MENT THAT ISSUED THE CARD | IMAGE INFO (PER-SONAL POR-TRAIT) | IMAGE INFO (PRINT OF SEAL) | IMAGE INFO (SIGNA-TURE) |
| AUTHEN-TICATION ACCEP-TANCE NUMBER | AUTHEN-TICATION REQUET NUMBER | AUTHEN-TICATION COUNTER | | | | |

608  609  610

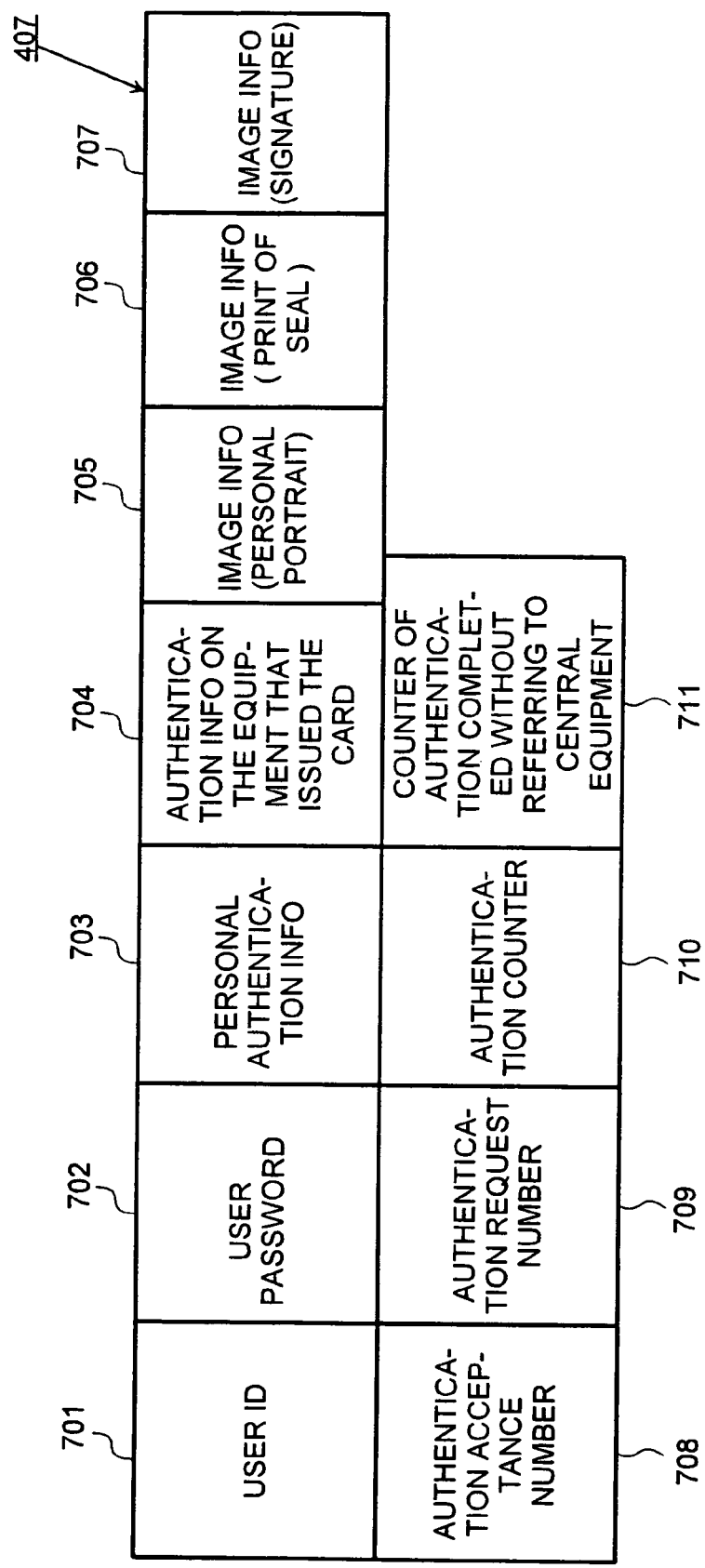

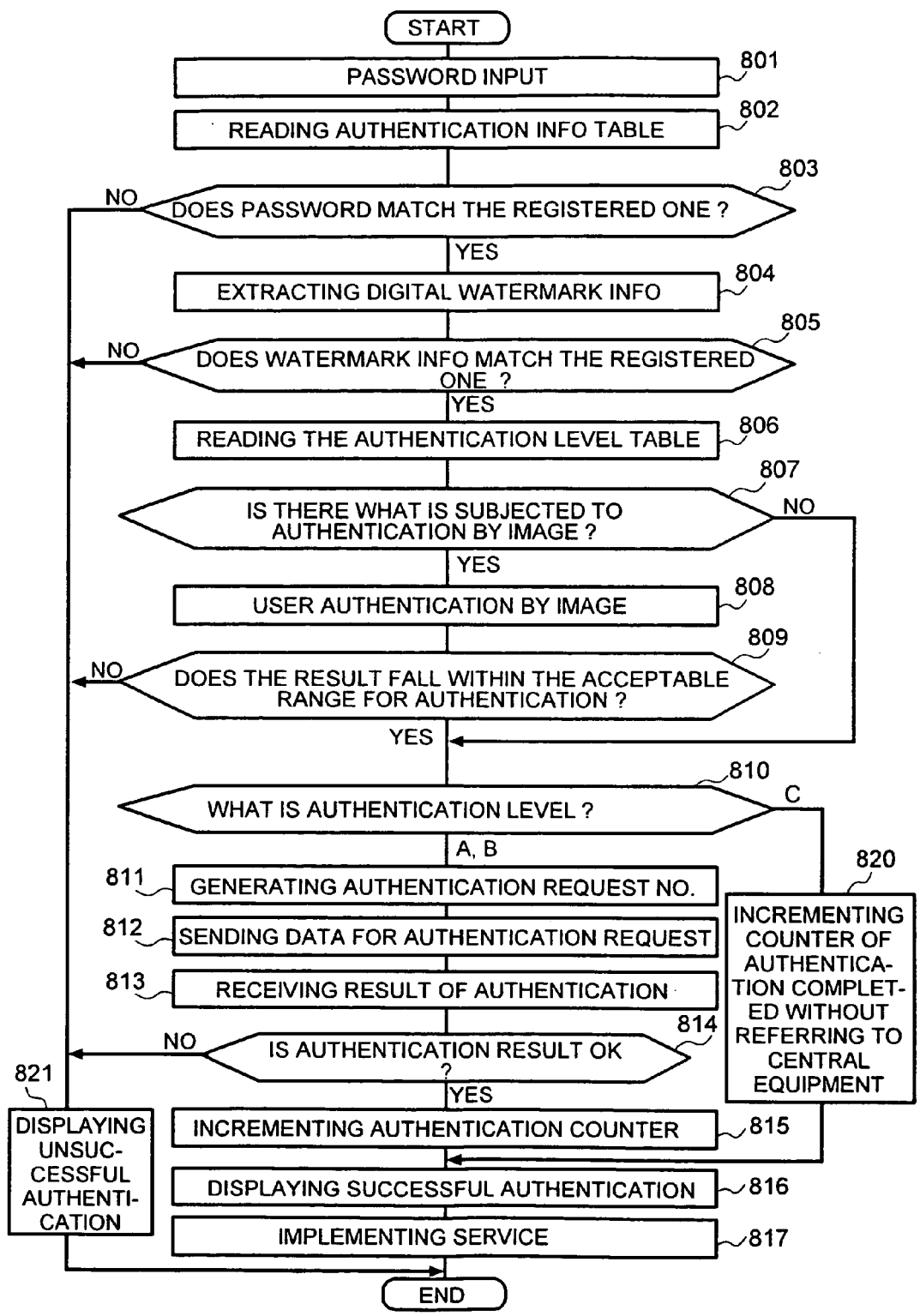

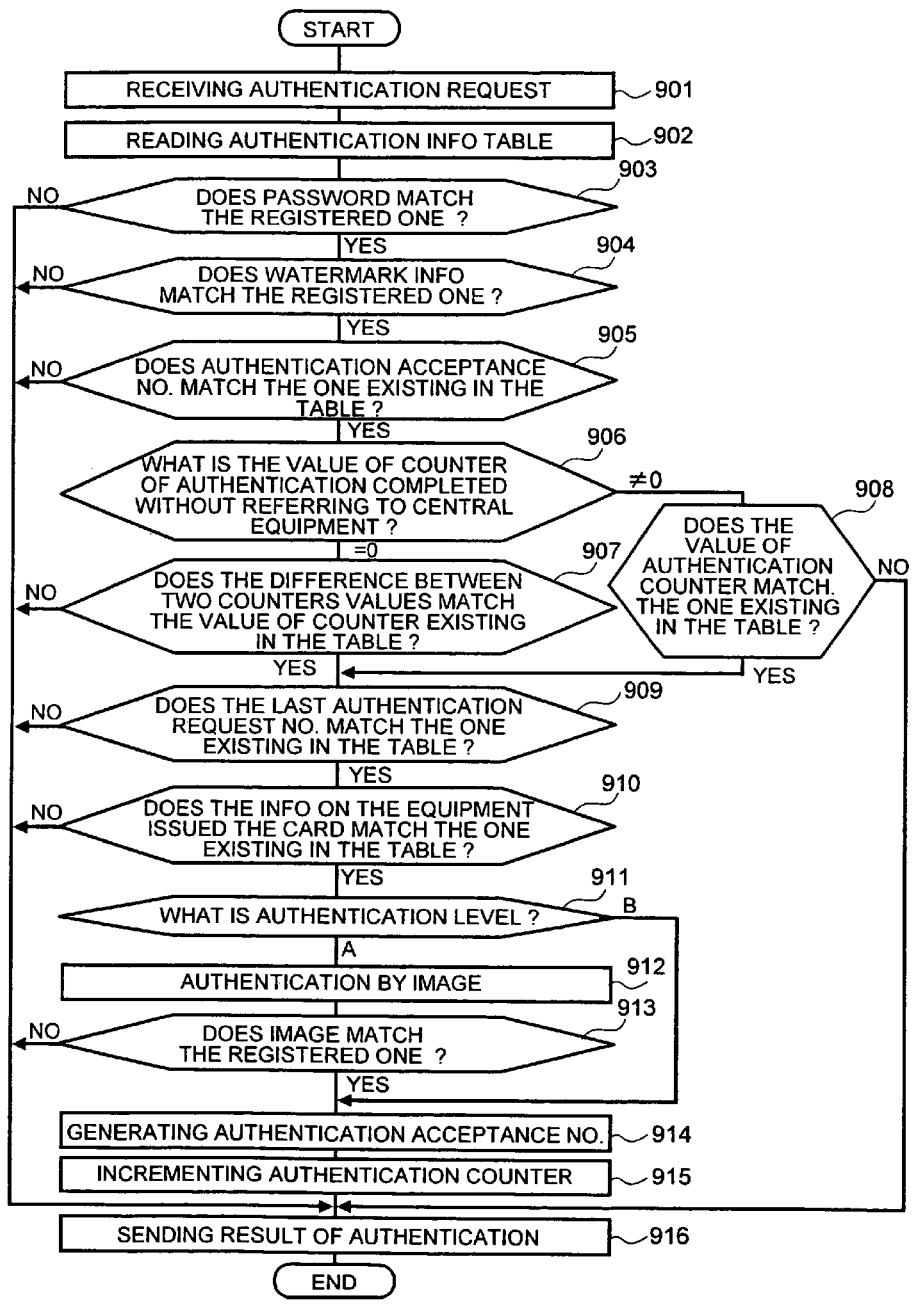

METHOD AND SYSTEM FOR ELECTRONIC AUTHENTIFICATION

BACKGROUND OF THE INVENTION

The prevent invention relates to an electronic authentication system for identifying a user who is going to use a recording medium in which information for making use of any kind of computerized service has been stored. More particularly, the invention relates to technology effective for application to an electronic authentication system for identifying a person who is going to use an IC card as the valid possessor of the IC card on which information has been stored for making use of any kind of computerized service. The invention is applicable, to e.g., a digital money system, a computerized certificate card of residence issued by a local government, or a home security system assuring lock/unlock conditions under centralized supervision.

Nowadays, systems have been devised to provide a certain kind of computerized service, such as, for example, a digital money system, a computerized certificate card of residence issued by a local government, or a home security system assuring lock/unlock conditions under centralized supervision, by storing the information for such service on a card-shaped recording medium and implementing the service, based on the information recorded on the card when the service is requested. When any of these systems provides service in this way through a card on which information for making use of the service has been stored, authentication is necessary to establish that the person who is going to use the card is a valid user of the card. For example, a system that allows a person to pay for purchased goods using a credit card generally uses an authentication method in which the system is given the code number of the person who is using the card for payment when identifying the card user.

Japanese Patent Prepublication No. Hei 10-149103 describes an authentication method and an authentication system in which it is possible to detect a counterfeit IC card offline from the central computer; i.e., there is no need for online communication between an electronic commerce and settlement terminal and the central computer for user authentication.

Japanese Patent Prepublication No. Hei 11-282998 describes a method of identifying a user of a communication system, which method is applied to communication systems comprising user cards, communication terminals and communication servers. According to this method, in the user authentication protocol to be completed when connecting a communication terminal to a communication server, the user operation is simple and data transmission and reception between the terminal and the server for user authentication are required only once.

Because the above-mentioned previous systems using cards carry out user authentication based on the code number of a specific user, a problem is encountered in that there is a possibility of cheating in settling an account using a stolen card, a counterfeit card, or the necessary code number acquired by dishonest means. In the present situation, there are no generally practicable methods which represent an alternative to the method of the present invention. In the future, electronic settlement and similar procedures using cards are expected to be prevalent, and so it will be important in carrying out such procedures to identify a person who is using the card.

SUMMARY OF THE INVENTION

The present invention has the object of providing a technology that solves the above problem and makes it possible to prevent cheating in the use of a recording medium on which information for making use of any kind of computerized service has been stored and to carry out authentication applicable to various computerized settlement systems and procedures at any place or any authentication level required.

In an electronic authentication system for identifying a user who is going to use a recording medium on which information for making use of any kind of computerized service has been stored, the present invention implements authentication of the user by using authentication information presented by the user, the authentication information recorded on the recording medium, and the registered authentication information existing in the hub of the network to provide the service.

In acccordance with the present invention, a user who wants to use a certain computerized service must, in advance, register authentication information for identifying the user with the central equipment in the hub of the network which is to provide the service. The central equipment records the authentication information on a recording medium and issues the recording medium to the user. Thus, the user gets his or her own recording medium in advance.

For example, a picture of the user's face, the image of a seal, or a signature is read by an image recognizing device, a seal reader, or a signature reader and is digitized. The central equipment of the electronic authentication system registers the digitized authentication information into a personal authentication information table for centralized management, stores the information on an IC card, and issues the card to the user.

When the user is going to use the service, the user inputs the user's authentication information and the authentication information recorded on the recording medium that the user has with him or her. Authentication is carried out by comparing the authentication information input by the user and the authentication information recorded on the recording medium.

Specifically, client-end equipment of the electronic authentication system includes peripheral devices, such as the above-mentioned image recognizing device, seal reader, and signature reader, and an IC card reader. These devices scan the user's face, a seal, and a signature, if appropriate, and input the resulting images to the equipment. At the same time, the IC card reader reads the authentication information from the IC card, such as the image of a face, the image of a seal, and a signature. The equipment compares the face image, seal, and signature input by the user with the corresponding authentication information read from the IC card, such as face image data, seal image data, and signature data and checks for a match between them.

According to a preset condition, further authentication is carried out by comparing the authentication information input by the user or the authentication information recorded on the recording medium with the registered authentication information existing at the central equipment. According to the result of this authentication, the electronic authentication system judges whether the user who is going to use the recording medium is a valid registered user for the service.

Because the electronic authentication system of the present invention executes user authentication by using authentication information input by the user who is going to use the recording medium, the authentication recorded on the recording medium, and the authentication information registered at the central equipment, as described above, the system can prevent cheating in the use of the recording medium on which information for making use of any kind of computerized service has been stored. Furthermore, the system can carry out authentication applicable to various computerized settlement systems and procedures at any place or any authentication level required.

BRIEF DESCRIPTION OF THE DRAWINGS

Other objects and advantages of the invention will become apparent during the discussion of the accompanying drawings, wherein:

FIG. 5 is a diagram schematizing the authentication level table 311 in the present embodiment;

FIG. 6 is a diagram schematizing the authentication information table 211 in the present embodiment;

FIG. 7 is a diagram schematizing the authentication information table 407 in the present embodiment;

FIG. 8 is a flowchart showing the procedure for authentication processing to be executed by the client-end equipment in the present embodiment; and FIG. 9 is a flowchart showing the procedure for authentication processing to be executed by the central equipment in the present embodiment.

DETAILED DESCRIPTION OF THE PREFERRED EMBODIMENTS

As a preferred embodiment of the invention, an electronic authentication system for identifying a user who is going to use an IC card will be explained.

Figure 1:
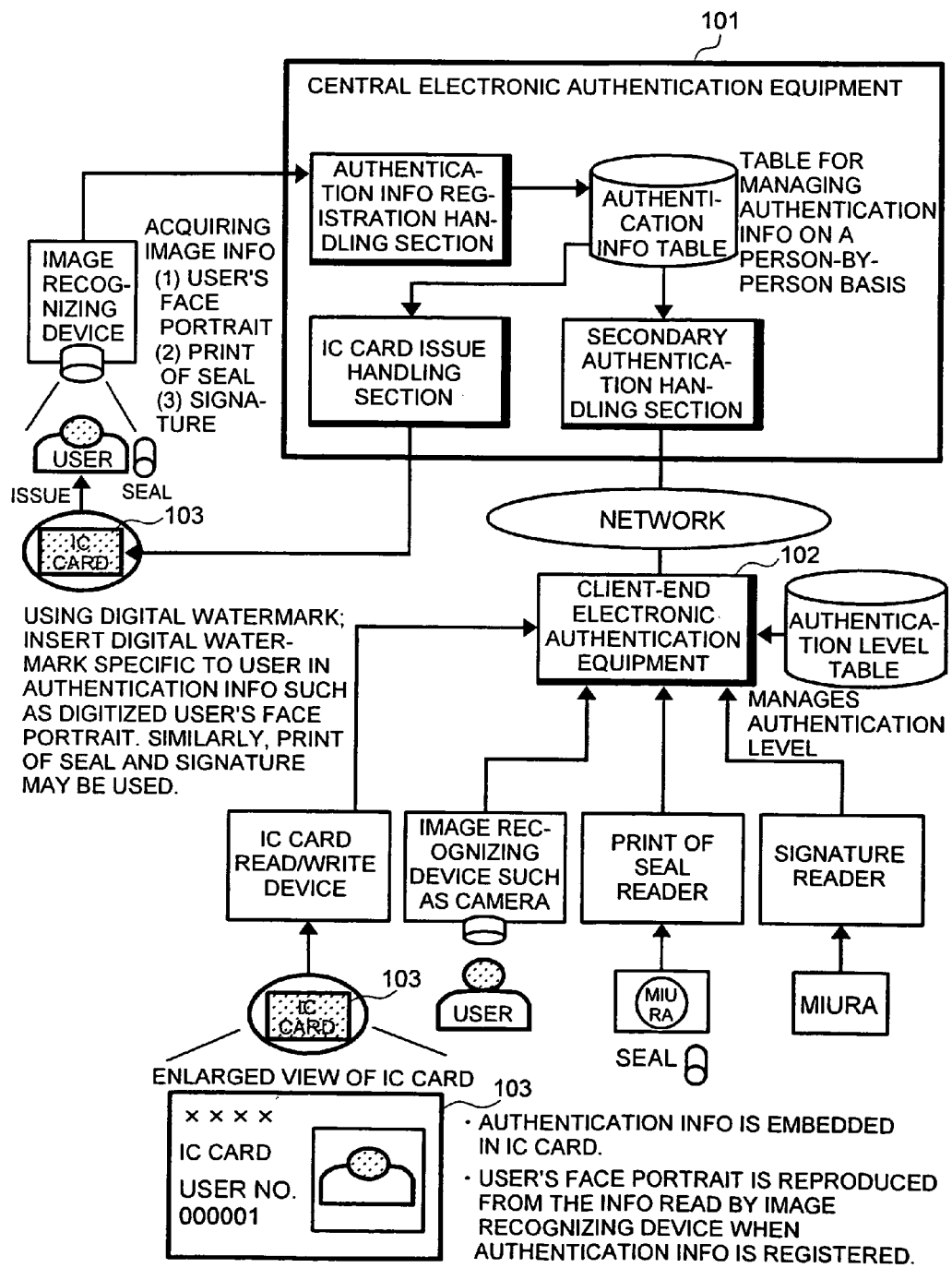
FIG. 1 is a schematic diagram outlining the electronic authentication system of the present embodiment.

FIG. 1 is a schematic diagram outlining the electronic authentication system of the present embodiment. As shown in FIG. 1, the electronic authentication system of the present embodiment essentially comprises a central electronic authentication equipment 101, a client-end electronic authentication equipment 102, and an IC card 103.

The central electronic authentication equipment 101 stores authentication information in its authentication information table, handles the issue of IC card 103, and performs user authentication processing. The client-end electronic authentication equipment 102 handles user authentication at the client terminal. The IC card 103 is a recording medium on which information for making use of any kind of computerized service is stored.

Figure 2:
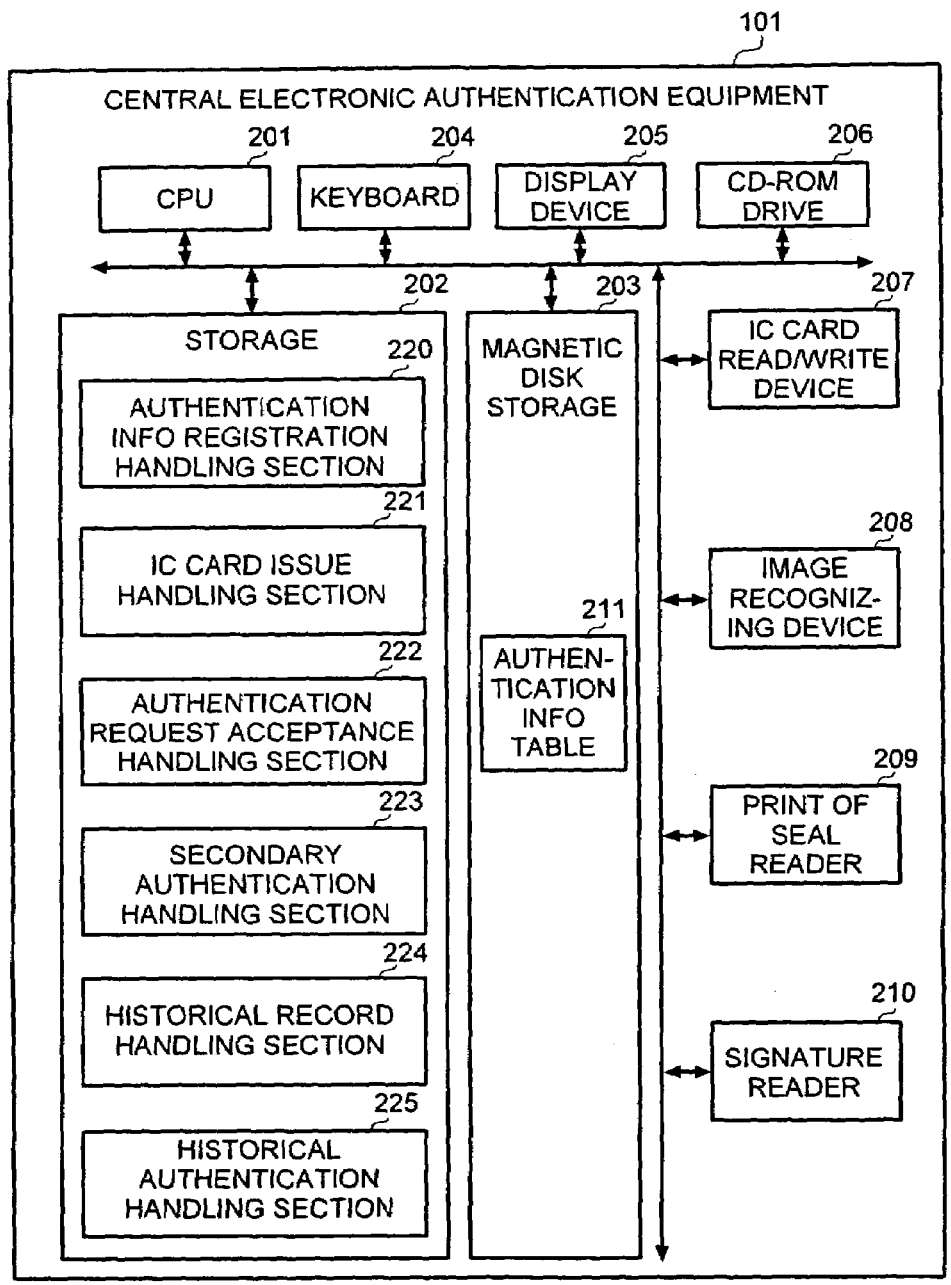
FIG. 2 is a block diagram showing a schematic structure of the central electronic authentication equipment 101 in the present embodiment.

FIG. 2 is a block diagram showing a schematic structure of the central electronic authentication equipment 101 in the present embodiment. As shown in FIG. 2, the central electronic authentication equipment 101 comprises a CPU 201, storage 202, magnetic disk storage 203, a keyboard 204, a display device 205, a CD-ROM drive 206, an IC card read/write device 207, an image recognizing device 208, a seal reader 209, a signature reader 210, and an authentication information table 211.

The CPU 201 controls all operations of the central electronic authentication equipment 101. The storage 202 is a main storage into which various types of processing programs and data are loaded when required for controlling the operations of the central electronic authentication equipment 101.

The magnetic disk storage 203 is a storage for storing varioius types of processing programs and data. The keyboard 204 is used for various input operations required for the registration of authentication information, the issue of an IC card 103, and authentication processing.

The display device 205 displays various kinds of information for the registration of authentication information, the issue of an IC card 103, and authentication processing. The CD-ROM drive 206 reads the contents of a CD-ROM on which various types of processing programs have been recorded.

The IC card read/write device 207 stores authentication information on the IC card 103. The image recognizing device 208 is an interface for inputting, as image information, a picture of the face of the user who wants to recceive an IC card 103 on which information for making use of any kind of computerized service has been stored.

The seal reader 209 reads the image of a seal presented by the user as image information. The signature reader 210 reads the signature written by the user as image information. The authentication information table 211 is a table for storing the authentication information for identifying a user who wants to use any kind of computerized service.

In addition, the central electronic authentication equipment 101 includes an authentication information registration handling section 220, an IC card issue handling section 221, an authentication request acceptance handling section 222, a secondary authentication handling section 223, a historical record handling section 224, and a historical authentication handling section 225.

The authentication information registration handling section 220 registers the user supplied authentication information for identifying the user in the authentication information table 211. The IC card issue handling section 221 records the authentication information registered in the authentication information table 211 on the IC card 103 and issues the card to the user.

The authentication request acceptance handling section 222 receives the authentication information input by the user who is going to use the IC card 103 or the authentication information recorded on the IC card 103, accepts an authentication request from the client-end electronic authentication equipment 102, and in reply to the request, sends the result of authentication executed by the central electronic authentication equipment 101 to the client-end electronic authentication equipment 102.

The secondary authentication handling section 223 executes authentication by comparing the authentication information input by the user who is going to use the IC card 103 or the authentication information recorded on the IC card 103 with the authentication information registered in the central electronic authentication equipment 101.

The historical record handling section 224 records an authentication acceptance number generated upon the acceptance of an authentication request from the client-end electronic authentication equipment 102, an authentication request number generated upon the issue of an authentication request from the client-end electronic authentication equipment 102, or the value of an authentication counter to count a properly completed authentication on the central electronic authentication equipment 101.

The historical authentication handling section 225 executes authentication by comparing the authentication acceptance number, authentication request number, or authentication counter value recorded on the IC card 103 with the authentication acceptance number, authentication request number, or authentication counter value recorded in the central electronic authentication equipment 101.

Programs to control the operation of the authentication information registration handling section 220, the IC card issue handling section 221, the authentication request acceptance handling section 222, the secondary authentication handling section 223, the historical record handling section 224, and the historical authentication handling section 225 in the central electronic authentication equipment 101 are stored on a recording medium, such as a CD-ROM. After being stored on a magnetic disk, these programs shall be loaded into the main storage and run. A recording medium alternative to the CD-ROM may be used to record the programs.

Figure 3:
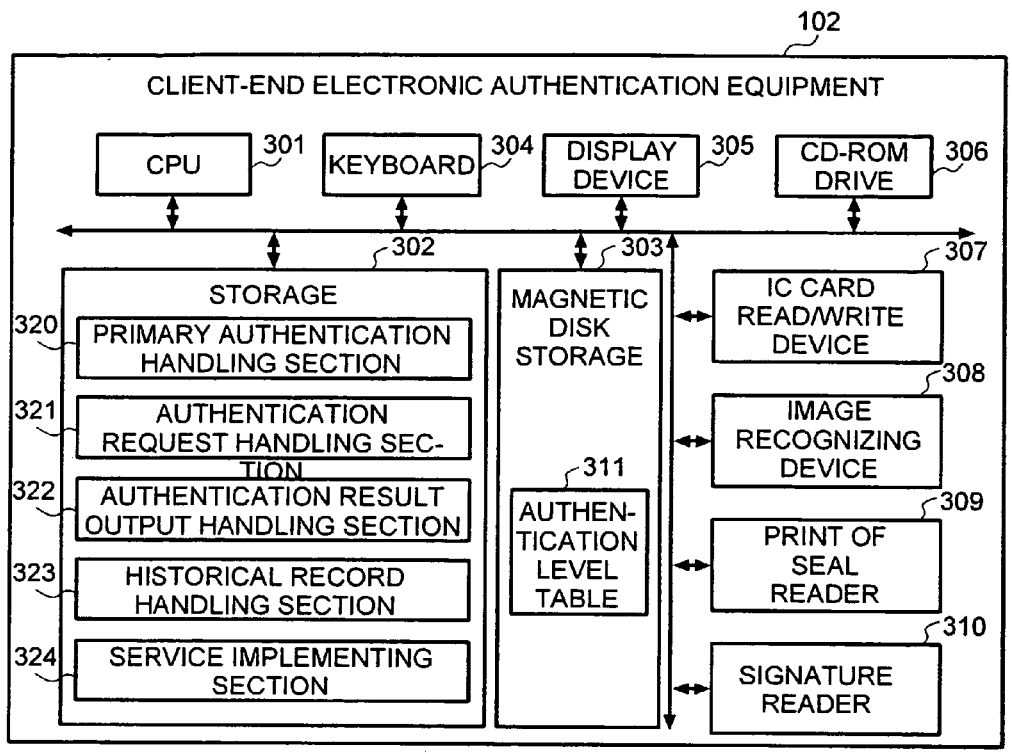
FIG. 3 is a block diagram showing a schematic structure of the client-end electronic authentication equipment 102 in the present embodiment.

FIG. 3 is a block diagram showing a schematic structure of the client-end electronic authentication equipment 102 in the present embodiment. As shown in FIG. 3, the client-end electronic authentication equipment 102 comprises, a CPU 301, storage 302, magnetic disk storage 303, a keyboard 304, a display device 305, a CD-ROM drive 306, an IC card read/write device 307, an image recognizing device 308, a seal reader 309, a signature reader 310, and an authentication level table 311.

The CPU 301 controls all operations of the client-end electronic authentication equipment 102. The storage 302 is a main storage into which various types of processing programs and data are loaded when required for controlling the operations of the client-end electronic authentication equipment 102.

The magnetic disk storage 303 is a storage for storing various types of processing programs and data. The keyboard 304 is used for various input operations required for authentication processing. The display device 305 displays various kinds of information for authentication processing.

The CD-ROM drive 306 reads the contents of a CD-ROM on which types of processing programs have been recorded. The IC card read/write device 307 reads/writes authentication information from/into the IC card 103.

The image recognizing device 308 is an interface for inputting a picture of the face of the user, who is going to use the IC card 103, in the form of image information. The seal reader 309 reads the image of a seal, presented by the user, in the form of image information.

The signature reader 310 reads the signature written by the user as image information. The authentication level table 311 stores the information that indicates what level of authentication processing is to be executed by the client-end electronic authentication equipment 102 and the central electronic authentication equipment 101.

In addition, the client-end electronic authentication equipment 102 includes a primary authentication handling section 320, an authentication request handling section 321, an authentication result output handling section 322, a historical record handling section 323, and a service implementing section 324.

The primary authentication handling section 320 executes authentication by comparing the authentication information input by the user who is going to use the IC card 103 with the authentication information recorded on the IC card 103. The authentication request handling section 321 sends the authentication information input by the user who is going to use the IC card 103 or the authentication information recorded on the IC card 103 to the central electronic authentication equipment 101, thus issuing an authentication request thereto, and receives the result of authentication executed by the central electronic authentication equipment 101.

The authentication result output handling section 322 judges whether the central electronic authentication equipment 101 has identified the user from the authentication information input by the user or the authentication information recorded on the IC card 103, according to the result of authentication received from the central electronic authentication equipment 101, and outputs the result of authentication.

The historical record handling section 323 records an authentication acceptance number which is generated upon the acceptance of an authentication request, an authentication request number which is generated upon the issue of an authentication request, or the value of an authentication counter to count a properly completed authentication on the IC card 103. In conjunction with the IC card 103, the service implementing section 324 executes a processing for making use of any kind of computerized service; e.g., a digital money system, a computerized certificate card of residence issued by a local government, or a home security system assuring lock/unlock conditions under centralized supervision.

Programs to control the operation of the primary authentication handling section 320, the authentication request handling section 321, the authentication result output handling section 322, the historical record handling section 323, and the service implementing section 324 of the client-end electronic authentication equipment 102 are recorded on a recording medium, such as a CD-ROM. After being stored on a magnetic disk, these programs shall be loaded into the main storage and run. A recording medium alternative to the CD-ROM may be used to record the programs.

Figure 4:
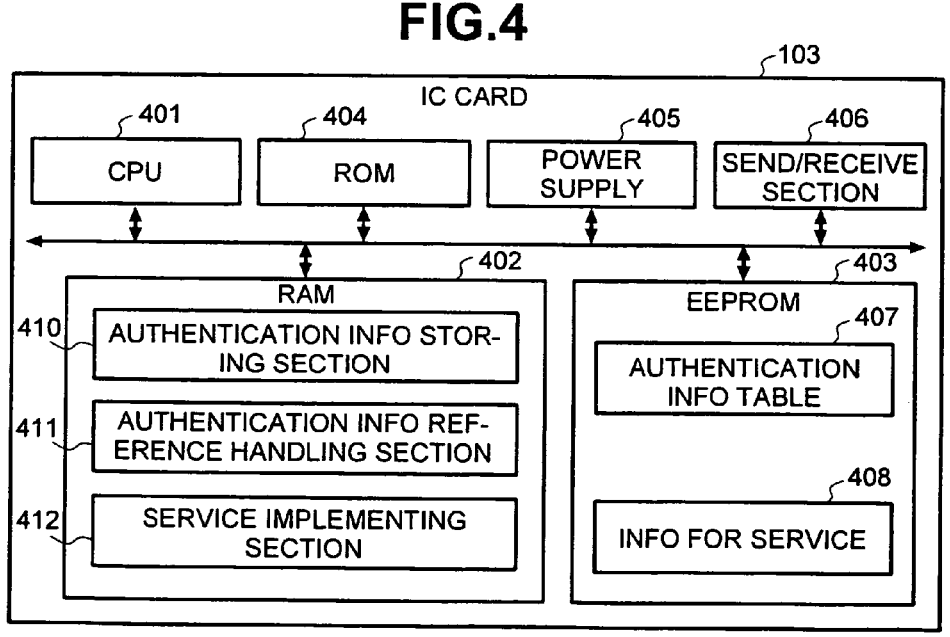
FIG. 4 is a block diagram showing a schematic structure of the IC card 103 in the present embodiment.

FIG. 4 is a block diagram showing a schematic structure of the IC card 103 in the present embodiment. As shown in FIG. 4, the IC card 103 comprises a CPU 401, a RAM 402, an EEPROM 403, a ROM 404, a power supply 405, a send/receive section 406, an authentication information table 407, and information for service 408.

The CPU 401 controls all operations of the IC card 103. The RAM 402 is a storage into which various types of processing programs and data are loaded when required for controlling the operations of the IC card 103. The EEPROM 403 is a storage for storing the authentication information table 407.

The ROM 404 is a storage for storing various types of processing programs and data, such as an operating system for controlling all operations of the IC card 103. The power supply 405 operates to supply all parts of the IC card 103 with the electric power required for operation.

The send/receive section 406 is provided for inputting and outputting data from/to the central electronic authentication equipment 101 and the client-end electronic authentication equipment 102. The authentication information table 407 stores the authentication information for identifying the user who wants to use any kind of computerized service. The information for service 408 is information for making use of any kind of computerized service; e.g., a digital money system, a computerized certificate card of residence issued by a local government, or a home security system assuring lock/unlock conditions under centralized supervision.

In addition, the IC card 103 includes an authentication information storing section 410, an authentication information reference handling section 411, and a service implementing section 412.

The authentication information storing section 410 stores authentication information sent from the central electronic authentication equipment 101 and the client-end electronic authentication equipment 102 into the authentication information table 407. The authentication information reference handling section 411 reads the authentication information from the authentication information table 407 and sends it to the client-end electronic authentication equipment 102.

In conjunction with the client-end electronic authentication equipment 102, the service implementing section 412 executes processing for making use of any kind of computerized service, such as, for example, a digital money system, a computerized certificate card of residence issued by a local government, or a home security system assuring lock/unlock conditions under centralized supervision, by using the information for service 408.

Programs to control the operation of the authentication information storing section 410, the authentication information reference handling section 411, and the service implementing section 412 of the IC card 103 are recorded on a recording medium, such as a ROM and shall be run when necessary. A recording medium alternative to the ROM may be used to record the programs.

In the present embodiment, the client-end electronic authentication equipment 102 to provide the user with any kind of computerized service sets an authentication processing level suitable for the service of implementation in the authentication level table 311; the service is, for example, a digital money system, a computerized certificate card of residence issued by a local government, or a home security system assuring lock/unlock conditions under centralized supervision.

FIG. 5 is a diagram schematizing the authentication level table 311 in the present embodiment. As shown in FIG. 5, the authentication level table 311 comprises four data items: what is subjected to authentication by image 501, authentication level 502, acceptable range of image recognition (from) 503, and acceptable range of image recognition (to) 504.

What is subjected to authentication by image 501 is data to indicate what image information is subjected to authentication by an image. Authentication level 502 is data to indicate what level of authentication processing is to be executed by the client-end electronic authentication equipment 102 and the central electronic authentication equipment 101.

Acceptable range of image recognition (from) 503 is the minimum extent to which the two images match up when judged to be matching by comparison. Acceptable range of image recognition (to) 504 is the maximum extent to which the two images match up when judged to be matching by comparison.

In the authentication level table 311 in the present embodiment, the above data items are set, depending on how high the security is required to be for the computerized service of implementation; e.g., a digital money system, a computerized certificate card of residence issued by a local government, or a home security system assuring lock/unlock condition under centralized supervision.

For example, if authentication by an image is required, as the data item of what is subjected to authentication by image 501, data such as "user's face," "image of a seal," or "signature" is set to specify a type of image information. If authentication by an image is not necessary, data to specify "authentication by ID" is set. "Authentication by ID" indicates authentication by a user ID number and a password and authentication processing on the basis of an authentication acceptance number, an authentication request number, or an authentication counter value.

For the authentication level 502, data to designate "authentication level A," "authentication level B," or "authentication level C" is set. "Authentication level A" means that the client-end electronic authentication equipment 102 executes primary authentication and the central electronic authentication equipment 101 executes secondary authentication for all authentication information. By thus executing authentication processing by both the client-end electronic authentication equipment 102 and the central electronic authentication equipment 101, protection against imitating the IC card 103 is provided and more reliable and firm authentication processing can be executed.

"Authentication level B" means that after the client-end electronic authentication equipment 102 executes primary authentication, the central electronic authentication equipment 101 executes secondary authentication as in "authentication level A", except that the central electronic authentication equipment 101 does not execute authentication using image information during the secondary authentication. Instead, the central electronic authentication equipment 101 executes authentication based on only numerical information (such as user ID, password, authentication acceptance number, authentication request number, or authentication counter value). "Authentication level C" means that the client-end electronic authentication equipment 102 completes the authentication procedure.

If "authentication by ID," which means that authentication by an image is not executed, is set for what is subjected to authentication by image 501, the authentication level 502 is set at "authentication level A" with the acceptable range of image recognition (from) 503 and acceptable range of image recognition (to) 504 being "0%."

In the present embodiment, on the other hand, a user who wants to use a certain computerized service must initially input the authentication information for identifying the user to the system and register with the central electronic authentication equipment 101 where the authentication information is registered in the authentication information table 211. The authentication information is then recorded on the IC card 103 that is in turn issued to the user. In this way, the user must get his or her own IC card 103 in advance.

FIG. 6 is a diagram schematizing the authentication information table 211 in the present embodiment. As shown in FIG. 6, the authentication information table 211 comprises data items: user ID 601, user password 602, personal authentication information 603, authentication information on the equipment that issued the card 604, image information 605 to 607, authentication acceptance number 608, authentication request number 609, and authentication counter 601.

User ID 601 is an identifier to identify the user who registered his or her authentication information with the central electronic authentication equipment 101. User password 602 is the set password of the user. Personal authentication information 603 is a hash value specific to each user, set to identify the user.

Authentication information on the equipment that issued the card 604 is a hash value to identify the central electronic authentication equipment 101 that issued the IC card 103 on which the registered authentication information has been stored. Image information 605 to 607 are image data of a user's face, image of a seal, and a signature that have been registered as authentication information.

Authentication acceptance number 608 is the authentication number (random number) set the last time the central electronic authentication equipment 101 accepted an authentication request from the client-end electronic authentication equipment 102. Authentication request number 609 is the authentication number (random number) set the last time the client-end electronic authentication equipment 102 issued an authentication request to the central electronic authentication equipment 101. Authentication counter 610 is data to count successfully completed authentication of the user who is going to use the IC card 103 as the valid possessor of the IC card 103.

When registering a user who wants to use a certain computerized service in the present embodiment, first, the authentication information registration handling section 220 of the central electronic authentication equipment 101 writes user ID 601 of the user and user password 602 input by the user into the appropriate setting fields of the authentication information table 211.

Next, the authentication information registration handling section 220 generates a hash value that is specific to the user for identifying the user and writes the hash value into the setting field of personal authentication information 603, and then sets a hash value for identifying the central electronic authentication equipment 101 and writes it into the setting field of authentication information on the equipment that issued the card 604.

Then, using the image recognizing device 208, seal reader 209, or signature reader 210, the authentication information registration handling section 220 reads the picture of the user's face, a print of the seal presented by the user, or the signature written by the user, which is specified as that which is subjected to authentication by an image to acquire the image information. After embedding the personal authentication information 603 as a digital watermark into the image in order to detect imitation of the image if a counterfeit should be used, the authentication information registration handling section 220 stores the image into the appropriate one of the fields of image information 605 to 607. Besides, the authentication information registration handling section 220 initializes the values of authentication acceptance number 608, authentication request number 609 and authentication counter 610 to "0."

Next, the IC card issue handling section 221 of the central electronic authentication equipment 101 records the authentication information thus registered in the authentication information table 211 into the authentication information table 407 of the IC card 103 and issues the IC card 103 to the user.

FIG. 7 is a diagram schematizing the authentication information table 407 in the present embodiment. As shown in FIG. 7, the authentication information table 407 comprises data items: user ID 701, user password 702, personal authentication information 703, authentication information on the equipment that issued the card 704, image information 705 to 707, authentication acceptance number 708, authentication request number 709, and authentication counter 710, and counter of authentication completed without referring to central equipment 711.

User ID 701 is an identifier to identify the valid user of the IC card 103. User password 702 is the set password of the user. Personal authentication information 703 is a hash value specific to each user, set to identify the user.

Authentication information on the equipment that issued the card 704 is a hash value to identify the central electronic authentication equipment 101 that issued the IC card 103. Image information 705 to 707 are image data of user's face, an image of the seal, and a signature of the valid user of the IC card 103, respectively.

Authentication acceptance number 708 is the authentication number (random number) set the last time the central electronic authentication equipment 101 accepted an authentication request from the client-end electronic authentication equipment 102. Authentication request number 709 is the authentication number (random number) set the last time the client-end electronic authentication equipment 102 issued an authentication request to the central electronic authentication equipment 101.

Authentication counter 710 is data to count successfully completed authentication of the user who is going to use the IC card 103 as the valid possessor of the IC card 103. Counter of authentication completed without referring to central equipment 711 is data to count successfully completed authentication of the user who is going to use the IC card 103 as the valid possessor of the IC card 103, completed without issuing an authentication request to the central electronic authentication equipment 101.

The IC card issue handling section 221 of the central electronic authentication equipment 101 in the present embodiment sends to the IC card 103 the foregoing authentication information registered in the authentication information table 211 to which the data item of counter of authentication completed without referring to central equipment 711 has been added, and instructs the IC card 103 to store that information. The authentication information storing section 410 of the IC card 103 receives the authentication information sent from the central electronic authentication equipment 101 and stores it into the authentication information table 407.

FIG. 8 is a flowchart illustrating the procedure for authentication processing to be executed by the client-end equipment in the present embodiment. A user who is seeks to obtain a certain computerized service sets the IC card 103 that the user has with him or her on the IC card read/write device 307 of the client-end electronic authentication equipment 102. The user commands the client-end equipment 102 to start authentication processing via the keyboard 304, then the primary authentication handling section 320 begins to operate.

In step 801, the primary authentication handling section 320 of the client-end electronic authentication equipment 102 accepts the password input by the user who is going to use the IC card 103. In step 802, the primary authentication handling section 320 instructs the IC card 103 of the user via the IC card read/write device 307 to send the contents of the authentication information table 407. The authentication information reference handling section 411 of the IC card 103 reads the authentication information from the authentication information table 407 and sends it to the client-end electronic authentication equipment 102.

In step 803, the primary authentication handling section 320 judges whether the password input by the user matches the user password 702 existing in the authentication information table 407 of the IC card 103. If both match up, the processing proceeds to step 804. If both do not match, the authentication processing terminates with the display of a message of unsuccessful authentication in step 821.

In step 804, the primary authentication handling section 320 reads the appropriate one of image information 705 to 707 from the authentication information table 407 of the IC card 103 and extracts the digital authentication information, namely, the embedded digital watermark from the appropriate image among the image information 705 to 707.

In step 805, the primary authentication handling section 320 judges whether the digital authentication information extracted from among the image information 705 to 707 matches the personal authentication information 703 existing in the authentication information table 407 of the IC card 103. If both match up, the processing proceeds to step 806. If both do not match, the authentication processing terminates with the display of a message of unsuccessful authentication in step 821.

In step 806, the primary authentication handling section 320 reads the authentication level table 311 stored into the magnetic disk storage 303 of the client-end electronic authentication equipment 102.

In step 807, the primary authentication handling section 320 judges whether there is what is subjected to authentication by image by referring to the data item of what is subjected to authentication by image 501 in the authentication level table 311. If image information to be subjected to authentication by image is set for the above data item, the processing proceeds to step 808. If none of image information to be subjected to authentication by image is set, the processing proceeds to step 810.

In step 808, by using the image recognizing device 308, seal reader 309, or signature reader 310 of the client-end electronic authentication equipment, the primary authentication handling section 320 reads the image of the user's face, a print of the seal presented by the user, or the signature written by the user which is indicated by what is subjected to authentication by image 501 to acquire the required image information. Then, the primary authentication handling section 320 compares the acquired image with the image data existing in the appropriate field among image information 705 to 707 stored in the authentication information table 407 of the IC card 103.

In step 809, the primary authentication handling section 320 judges whether the extent to which the acquired image of the user's face, the print of the seal, or signature matches the corresponding image information existing in the authentication information table 407 falls within the range specified by the acceptable range of image recognition (from) 503 and acceptable range of image recognition (to) 504. If the above comparison falls within the specified range, the processing proceeds to step 810. If the above comparisono falls outside the specified range, the authentication processing terminates with the display of a message of unsuccessful authentication in step 821.

In step 810, the primary authentication handling section 320 finds what is the authentication level 502: "authentication level A," "authentication level B," or "authentication level C." If the authentication level 502 is "authentication level A" or "authentication level B," the processing proceeds to step 811.

In step 811, a random number is generated as an authentication request number that is unique to an authentication request that the client-end electronic authentication equipment 102 is now going to issue to the central electronic authentication equipment 101. In step 812, the authentication request handling section 321 sends the thus generated current authentication request number and the contents of the authentication level 502 and the authentication information table 407 to the central electronic authentication equipment 101, thus issuing the authentication request thereto.

In step 813, the authentication request handling section 321 receives the result of authentication from the central electronic authentication equipment 101. In step 814, the authentication result output handling section 322 judges whether the central electronic authentication equipment 101 has identified the user by referring to the contents of the authentication information table 407, according to the result of authentication received. If authentication is successful, according to the contents of the authentication information table 407, the processing proceeds to step 815. If authentication is unsuccessful, the authentication processing terminates with the display of a message of unsuccessful authentication in step 821.

In step 815, the historical record handling section 323 sends to the IC card 103 the current authentication acceptance number that has now been generated by the central electronic authentication equipment 101, the current authentication request number generated under step 811 upon the issue of the authentication request, and the authentication counter value incremented by the central electronic authentication equipment 101, and the value of the counter of authentication completed without referring to central equipment 711 which has been initialized to "0" and instructs the IC card 103 to store them. The authentication information storing section 410 of the IC card 103 stores the authentication acceptance number, authentication request number, authentication counter value, and the value of the counter of authentication completed without referring to central equipment 711 received from the client-end electronic authentication equipment 102 into the authentication information table 407.

As the result of step 810, if the authentication level 502 in the authentication level table 311 is "authentication level C," the processing proceeds to step 820. In step 820, the historical record handling section 323 increments the authentication counter 710 and the counter of authentication completed without referring to central equipment 711 by one, sends the values of these counters to the IC card 103, and instructs the IC card 103 to store them. The authentication information storing section 410 of the IC card 103 stores the authentication counter value and the value of the counter of authentication completed without referring to central equipment 711 received from the client-end electronic authentication equipment 102 into the authentication information table 407.

In step 816, the authentication result output handling section 322 displays a message indicating that the user who is going to use the IC card 103 has been identified as the valid possessor of the IC card 103. In step 817, the service implementing section 324, in conjunction with the service implementing section 412 of the IC card 103, executes the processing for making use of a certain computerized service; e.g., a digital money system, a computerized certificate card of residence issued by a local government, or a home security system assuring lock/unlock conditions under centralized supervision.

FIG. 9 is a flowchart explaining the procedure for authentication processing to be executed by the central equipment in the present embodiment. In step 901, the authentication request acceptance handling section 222 of the central electronic authentication equipment 101 receives an authentication request sent from the client-end electronic authentication equipment 102 and accepts the authentication request.

In step 902, the secondary authentication handling section 223 reads the record associated with the user ID 701 received from the client-end electronic authentication equipment 102 out of the authentication information table 211 from the magnetic disk storage 203.

In step 903, the secondary authentication handling section 223 judges whether the user password 702 received from the client-end electronic authentication equipment 102 matches the user password 602 existing in the authentication information table 211 of the central electronic authentication equipment 101. If both match up, the processing proceeds to step 904. If both do not match, the indication "unsuccessful" is set as the result of authentication and the processing proceeds to step 916.

In step 904, the secondary authentication handling section 223 judges whether the personal authentication information, namely, the embedded digital watermark in the appropriate image among the image information 705 to 707 received from the client-end electronic authentication equipment 102 matches the personal authentication information 603 existing in the authentication information table 211 of the central electronic authentication equipment 101. If both match up, the processing proceeds to step 905. If both do not match, the indication "unsuccessful" is set as the result of authentication and the processing proceeds to step 916.

In step 905, the historical authentication handling section 225 judges whether the authentication acceptance number 708 received from the client-end electronic authentication equipment 102 matches the authentication acceptance number 608 existing in the authentication information table 211 of the central electronic authentication equipment 101. If both match up, the processing proceeds to step 906. If both do not match, the indication "unsuccessful" is set as the result of authentication and the processing proceeds to step 916.

In step 906, the historical authentication handling section 225 judges whether the value of the counter of authentication completed without referring to central equipment 711 received from the client-end electronic authentication equipment 102 is "0." If the value of the counter of authentication completed without referring to central equipment 711 is "0," the processing proceeds to step 907. If the value is not "0," the processing proceeds to step 908.

In step 907, the historical authentication handling section 225 judges whether the value of the authentication counter 710 received from the client-end electronic authentication equipment 102 matches the value of the authentication counter 610 existing in the authentication information table 211 of the central electronic authentication equipment 101. If both match up, the processing proceeds to step 909. If both do not match, the indication "unsuccessful" is set as the result of authentication and the processing proceeds to step 916.

In step 908, the historical authentication handling section 225 judges whether the value resulting from subtracting the value of the counter of authentication completed without referring to central equipment 711 from the value of the authentication counter 710 received from the client-end electronic authentication equipment 102 matches the value of the authentication counter 610 existing in the authentication information table 211 of the central electronic authentication equipment 101. If both match up, the processing proceeds to step 909. If both do not match, the indication "unsuccessful" is set as the result of authentication and the processing proceeds to step 916.

In step 909, the historical authentication handling section 225 judges whether the last-time authentication request number 709 received from the client-end electronic authentication equipment 102 matches the authentication request number 609 existing in the authentication information table 211 of the central electronic authentication equipment 101. If both match up, the processing proceeds to step 910. If both do not match, the indication "unsuccessful" is set as the result of authentication and the processing proceeds to step 916.

In step 910, the secondary authentication handling section 223 judges whether the personal authentication information 703 and the authentication information on the equipment that issued the card 704 received from the client-end electronic authentication equipment 102 matches the personal authentication information 603 and the authentication information on the equipment that issued the card 604 existing in the authentication information table 211 of the central electronic authentication equipment 101. If both match up, the processing proceeds to step 911. If both do not match, the indication "unsuccessful" is set as the result of authentication and the processing proceeds to step 916.

In step 911, the secondary authentication handling section 223 finds what is the authentication level 502 received from the client-end electronic authentication equipment 102. If the authentication level is "authentication level A," the processing proceeds to step 912. If the authentication level is "authentication level B," the processing proceeds to step 914.

In step 912, the secondary authentication handling section 223 compares the appropriate image among image information 705 to 707 received from the client-end electronic authentication equipment 102 with the corresponding image among image information 605 to 607 existing in the authentication information table 211 of the central electronic authentication equipment 101.

In step 913, the secondary authentication handling section 223 judges whether the appropriate image among image information 705 to 707 received from the client-end electronic authentication equipment 102 matches the corresponding image among image information 605 to 607 existing in the authentication information table 211 of the central electronic authentication equipment 101. If both match up, the processing proceeds to step 914. If both do not match, the indication "unsuccessful" is set as the result of authentication and the processing proceeds to step 916.

In the present embodiment, authentication by an image is performed by comparing the appropriate image among image information 705 to 707 in the authentication information table 407 of the IC card 103 with the corresponding image among image information 605 to 607 in the authentication information table 211 of the central electronic authentication equipment 101. Alternatively, authentication by an image may be performed by comparing the image information input by the user through the client-end electronic authentication equipment 102 with the corresponding image among image information 605 to 607 in the authentication information table 211 of the central electronic authentication equipment 101.

In step 914, a random number is generated as an authentication acceptance number that is unique to the authentication request that the central electronic authentication equipment 101 has now accepted. In step 915, the historical record handling section 224 sets the thus generated current authentication acceptance number and the current authentication request number generated by the client-end electronic authentication equipment 102 for authentication acceptance number 608 and authentication request number 609 in the authentication information table 211. The historical record handling section 224 increments by one the value of the authentication counter received from the client-end electronic authentication equipment 102 and sets the incremented value for authentication counter 610 in the authentication information table 211. Furthermore, the thus generated current authentication acceptance number, the newly set authentication counter 610, and the data indicating successful authentication are set as the result of authentication and the processing proceeds to step 916.

In step 916, the authentication request acceptance handling section 222 sends the result of authentication as set through the foregoing processing to the client-end electronic authentication equipment 102.

Although the invention has been described in its preferred form with a certain degree of particularity, it is understood that the present disclosure of the preferred form may be changed in the details of construction and the combination and arrangement of parts without departing from the spirit and the scope of the invention as hereinafter claimed.

What is claimed is:

1. An electronic authentication method of identifying a user who is going to use a recording medium having stored therein information for making use of any kind of computerized service, said electronic authentication method comprising:
   - a step of comparing authentication information input by the user with authentication information recorded on the recording medium;
   - a step of judging, based on the authentication information input by the user and an authentication level table, having a plurality of entries each relating authentication information and an authentication level, whether to continue carrying out authentication of the user by comparing said authentication information input by the user or the authentication information recorded on said recording medium with registered authentication information existing in a hub of a network to provide the service to be used; and
   - a step of if it is judged to continue carrying out authentication, carrying out authentication of the user by comparing said authentication information input by the user or the authentication information recorded on said recording medium with said registered authentication information existing in the hub of the network to provide the service.

2. An electronic authentication method of identifying a user who is going to use a recording medium having stored therein information for making use of any kind of computerized service, said electronic authentication method comprising:
   - a step of judging, based on authentication information input by the user and an authentication level table, having a plurality of entries each relating authentication information and an authentication level, whether to continue carrying out authentication of the user by comparing said authentication information input by the user or authentication information recorded on said recording medium with registered authentication information existing in a hub of a network to provide the service to be used
   - a step of if it is judged to continue carrying out authentication, comparing the authentication information input by the user or the authentication information recorded on the recording medium with registered authentication information existing in a hub of a network to provide the service to be used;
   - a step of recording an authentication acceptance number generated upon acceptance of an authentication request, an authentication request number generated upon issue of an authentication request, or a value of an authentication counter to count properly completed authentication into central storage in the hub of the network to provide the service to be used; and
   - a step to carry out authentication of comparing the authentication acceptance number, authentication request number, or authentication counter value recorded on said recording medium with the authentication acceptance number, authentication request number, or authentication counter value recorded in said central storage.

3. The electronic authentication method according to claim 1, wherein said authentication information is image information for identifying the user.

4. The electronic authentication method according to claim 2, wherein said authentication information is image information for identifying the user.

5. An electronic authentication system for identifying a user who is going to use a recording medium having stored therein information for making use of any kind of computerized service, said electronic authentication system including:
   - a primary authentication handling section that executes authentication by comparing authentication information input by the user with authentication information recorded on said recording medium and judging, based on the authentication information input by the user and an authentication level table, having a plurality of entries each relating authentication information and an authentication level, whether to continue carrying out authentication of the user by comparing said authentication information input by the user or the authentication information recorded on said recording medium with registered authentication information existing in a hub of a network to provide the service to be used; and
   - a secondary authentication handling section that executes authentication by if it is judged to continue carrying out authentication, comparing said authentication information input by the user or authentication information recorded on said recording medium with registered authentication information existing in a hub of a network to provide the service to be used.

6. A central electronic authentication equipment for identifying a user who is going to use a recording medium having stored therein information for making use of any kind of computerized service, said central electronic authentication equipment comprising:
   - an authentication request acceptance handling section that receives authentication information input by the user or authentication information recorded on the recording medium, accepts an authentication request from a client-end electronic authentication equipment, and in reply to the request, sends a result of authentication executed by said central electronic authentication equipment to the client-end electronic authentication equipment; and
   - a secondary authentication handling section that executes authentication by judging, based on the authentication information input by the user, or authentication information recorded on the recording medium, and an authentication level table having a plurality of entries each relating authentication information and an authentication level, whether to continue carrying out authentication of the user by comparing said authentication information input by the user or the authentication information recorded on said recording medium with a registered authentication information existing in said central electronic authentication equipment, and if it is judged to continue carrying out authentication, carrying out authentication of the user by comparing said authentication information input by the user or the authentication information recorded on said recording medium with said registered authentication information existing in the hub of the network to provide the service.

7. A client-end electronic authentication equipment for identifying a user who is going to use a recording medium having stored therein information for making use of any kind of computerized service, said client-end electronic authentication equipment comprising:

a primary authentication handling section that executes authentication by comparing authentication information input by a user with authentication information recorded on said recording medium;

an authentication request handling section that sends said authentication information input by the user or authentication information recorded on said recording medium to central electronic authentication equipment, thus issuing an authentication request thereto, and receives a result of authentication executed by the central electronic authentication equipment; and an authentication result output handling section that judges whether the central electronic authentication equipment has identified the user from said authentication information input by the user or the authentication information recorded on said recording medium, according to a result of authentication received from the central electronic authentication equipment and outputs a result of authentication, wherein said central electronic authentication equipment receives authentication information input by the user or authentication information recorded on the recording medium, accepts an authentication request from a client-end electronic authentication equipment, sends a result of authentication executed by said central electronic authentication equipment to the client-end electronic authentication equipment, executes authentication by judging, based on the authentication information input by the user, or authentication information recorded on the recording medium, and an authentication level table having a plurality of entries each relating authentication information and an authentication level, whether to continue carrying out authentication of the user by comparing said authentication information input by the user or the authentication information recorded on said recording medium with a registered authentication information existing in said central electronic authentication equipment, and if it is judged to continue carrying out authentication, carrying out authentication of the user by comparing said authentication information input by the user or the authentication information recorded on said recording medium with said registered authentication information existing in the hub of the network to provide the service.

8. A computer-readable storage medium on which a program is stored for causing at least two computers in combination to operate as electronic authentication system for identifying a user who is going to use a recording medium having stored therein information for making use of any kind of computerized service, said program when executed causes said at least two computers to perform the steps of:

causing one of said at least two computers to operate as a primary authentication handling section that executes authentication by comparing authentication information input by the user with authentication information recorded on said recording medium; and causing the other of said at least two computers to operate as a secondary authentication handling section that executes authentication by judging, based on the authentication information input by the user and an authentication level table, having a plurality of entries each relating authentication information and an authentication level, whether to continue carrying out authentication of the user by comparing said authentication information input by the user or the authentication information recorded on said recording medium with the registered authentication information existing in a hub of a network to provide the service to be used, and if it is judged to continue carrying out authentication, carrying out authentication of the user by comparing said authentication information input by the user or the authentication information recorded on said recording medium with said registered authentication information existing in the hub of the network to provide the service.

* * * * *